US008466396B2

(12) United States Patent
Carll et al.

(10) Patent No.: US 8,466,396 B2
(45) Date of Patent: Jun. 18, 2013

(54) DISPOSABLE CONTAINER FOR PACKAGING, DISPLAY, HANDLING, AND COOKING OF FOOD ARTICLE

(76) Inventors: Don R. Carll, Atlanta, GA (US); Dennis Corbett, Ocala, FL (US)

(*) Notice: Subject to any disclaimer, the term of this patent is extended or adjusted under 35 U.S.C. 154(b) by 501 days.

(21) Appl. No.: 12/696,263

(22) Filed: Jan. 29, 2010

(65) Prior Publication Data
US 2011/0186567 A1 Aug. 4, 2011

(51) Int. Cl.
*H05B 6/80* (2006.01)
(52) U.S. Cl.
USPC ........... 219/734; 725/732; 725/733; 725/762; 725/763
(58) Field of Classification Search
USPC ...... 219/732, 733, 734, 725, 762, 763; 99/14, 99/425, 444, 445, 446, 448, 449, 450
See application file for complete search history.

(56) References Cited

U.S. PATENT DOCUMENTS

| 4,214,515 | A | | 7/1980 | Kubiatowicz | |
|---|---|---|---|---|---|
| 4,786,513 | A | * | 11/1988 | Monforton et al. | 426/107 |
| 4,954,356 | A | * | 9/1990 | Kappes | 426/107 |
| 5,045,330 | A | * | 9/1991 | Pawlowski | 426/107 |
| 5,970,858 | A | * | 10/1999 | Boehm et al. | 99/446 |
| 6,211,502 | B1 | | 4/2001 | Hechler, IV | |
| 6,229,131 | B1 | * | 5/2001 | Koochaki | 219/731 |
| 7,259,360 | B2 | | 8/2007 | Sholders | |
| 7,345,263 | B2 | | 3/2008 | Hechler, IV | |
| 2002/0185013 | A1 | | 12/2002 | London | |
| 2007/0158339 | A1 | * | 7/2007 | Beckman | 219/734 |
| 2010/0077929 | A1 | * | 4/2010 | Young | 99/349 |
| 2010/0193578 | A1 | * | 8/2010 | Sanders | 229/120 |

* cited by examiner

*Primary Examiner* — A. Sefer
(74) *Attorney, Agent, or Firm* — Patents on Demand, P.A.; Brian K. Buchheit; Scott M. Garrett

(57) ABSTRACT

A novel food cooker, especially for bacon, sausage patties and the like, and a method for microwave oven preparation of the same. The cooker includes a top cover, middle pan, and bottom basin each made of a biodegradable material wherein food may be packaged, displayed, and later cooked in a microwave oven without handling. The cooker is especially designed to aid removal of grease and other food drippings from the food while being cooked. The top cover prevents grease splatter in the microwave. The middle pan holds food and includes holes to allow grease or other food drippings to fall by gravity to the bottom basin which is adjoined to the middle pan. The used cooker also prevents the handling and contained food articles, and prevents exposure to hot grease and drippings during disposal.

8 Claims, 3 Drawing Sheets

PERSPECTIVE VIEW - COOKER (20)

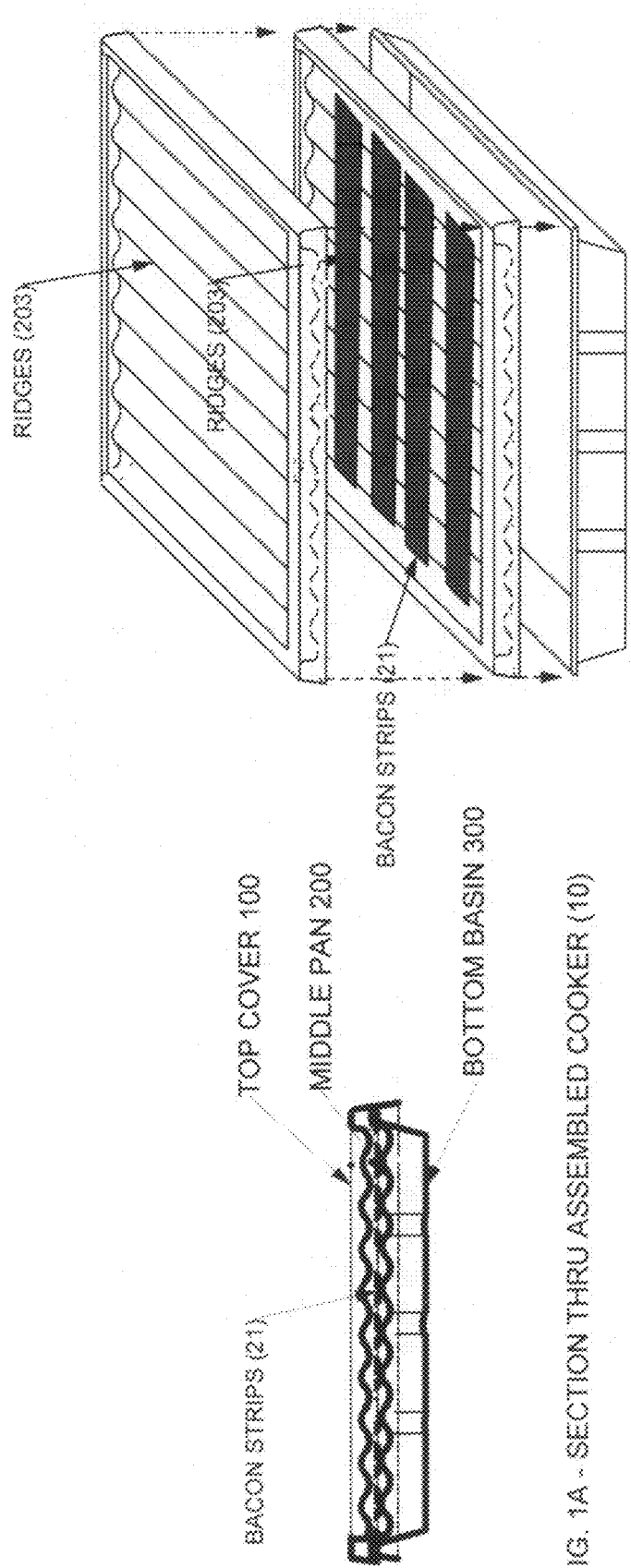

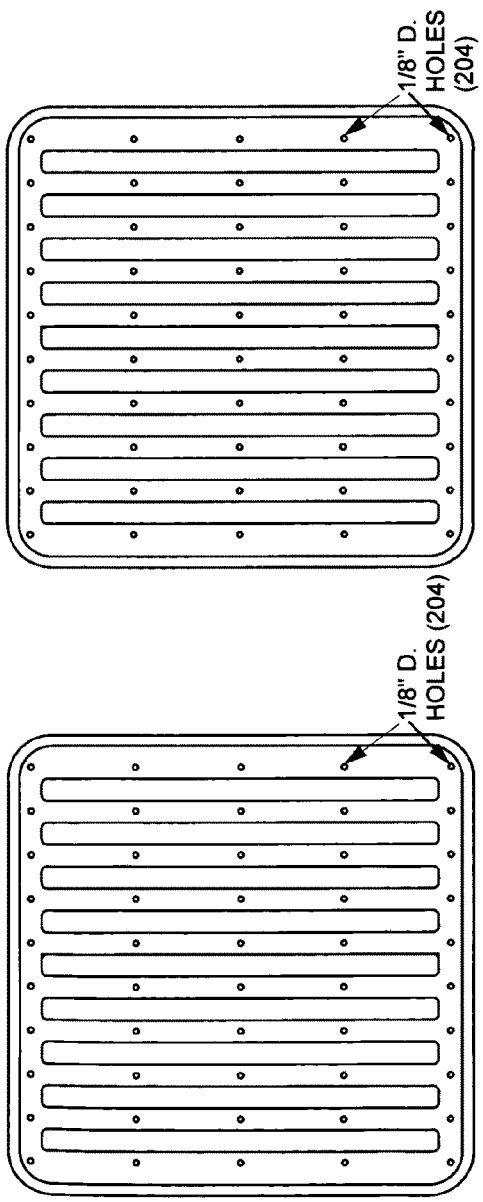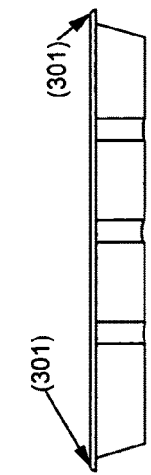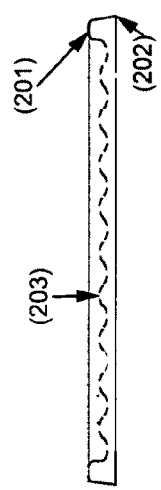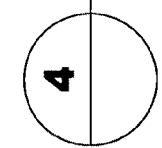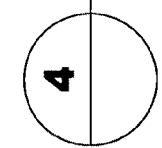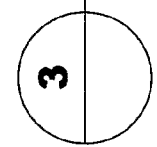

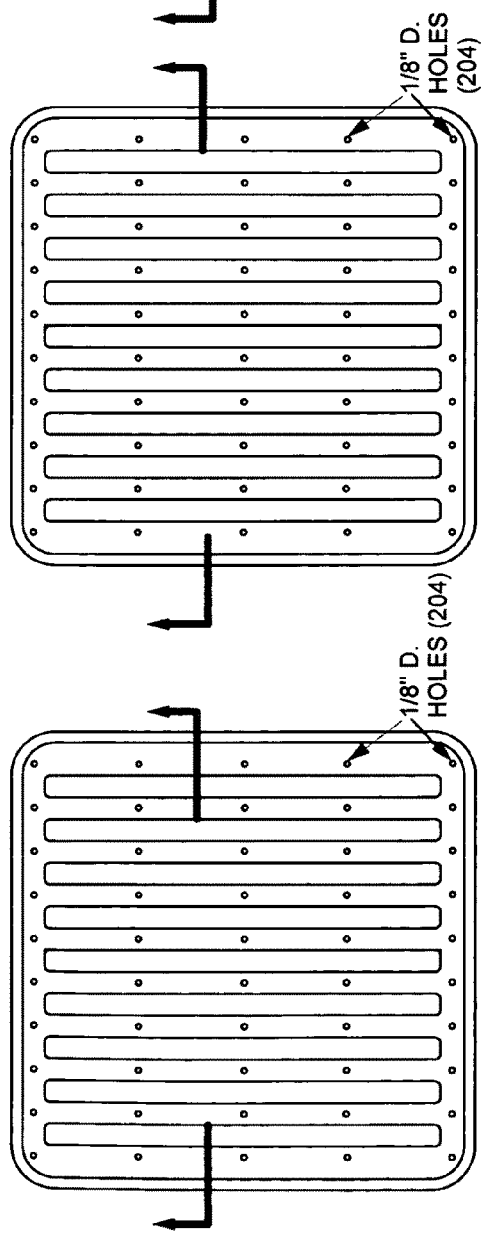
FIG. 7A - BOTTOM VIEW OF BOTTOM BASIN (300)
FIG. 6A - BOTTOM VIEW OF MIDDLE PAN (200)
FIG. 5A - BOTTOM VIEW OF TOP COVER (100)
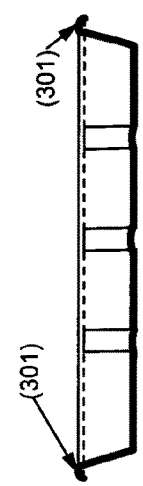
FIG. 7B - SECTION THRU BOTTOM BASIN (300)
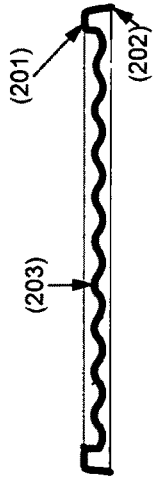
FIG. 6B - SECTION THRU MIDDLE PAN (200)
FIG. 5B - SECTION THRU TOP COVER (100)
7 — BOTTOM BASIN 300
6 — MIDDLE PAN 200
5 — TOP COVER 100

DISPOSABLE CONTAINER FOR PACKAGING, DISPLAY, HANDLING, AND COOKING OF FOOD ARTICLE

CROSS-REFERENCE TO RELATED APPLICATION

There are no applications previously filed or pending for which this application seeks priority or co-pendency.

BACKGROUND OF THE INVENTION

This invention relates to an apparatus for cooking bacon, sausage and the like, and vegetables and other like foods in a microwave oven. The apparatus is also generally useful in packaging, shipping and displaying foods, while also being biodegradable for environmentally-conscience disposal.

Conventional cooking generally involves handling of foods with utensils or by hand. Such handling introduces the risk of contamination transfer between the handling means and the food, or other loss such as the accidental dropping of food on an unclean surface, e.g., floor. In the case of bacon and similar fatty foods, e.g., sausage links and patties, hamburgers, hot dogs, etc., cooking gives off liquid such as grease and often results in splattering of the liquid onto nearby surfaces. In addition, the food generally remains in contact with the grease, resulting in a less than desirable palatability and presentation. Conventional cooking also exposes the preparer to potential hazards associated with the handling of the cooked foods such as burning from the released hot grease and liquids.

One improvement in cooking foods such as bacon has been by preparing them in microwave ovens. A common practice in cooking bacon in microwave ovens is to place the bacon strips between paper towels on a paper plate or microwave-safe sheet during cooking so that the paper towels will contain and absorb the grease. This method, however, is time consuming and messy to use, requiring cleanup and disposal of grease-soaked paper towels. Other devices and methods have been introduced to try to manage the liquids produced from cooking bacon in microwave ovens however they do not provide the level of protection against grease splatter, introduction of grease into sewers or septic systems, or convenience of use and environmentally conscience disposal. In addition, prior devices are not suitably designed for cooking or inclusive of a comprehensive approach to solving issues like packaging, shipping cooking and biodegradable environmentally conscience disposable incorporated into one device. In addition, the prior art devices do not include a means for cooking other food articles such as vegetables.

Various microwave oven bacon cooker devices are disclosed for holding and otherwise aiding the cooking of bacon, including U.S. Pat. Nos. 4,214,515; 6,211,502; 7,259,360; 7,345,263; and U.S. Pat. Appl. Pub. 2008/0110353. Of these, U.S. Pat. No. 4,214,515 to Kubiatowicz provides a structure for cooking bacon in a microwave oven. The patent describes a structure useful for moving grease away from bacon during cooking; however, the structure does not prevent upward splattering of bacon grease. In addition the structure has little utility for packaging and displaying foods, and does not prevent food from being handled and is not biodegradable for environmentally friendly disposable.

Similarly, U.S. Pat. Nos. 6,211,502 and 7,345,263 to Hechler provide a means for preventing bacon grease from splattering during cooking by providing a closed container in which to cook, but it does not allow for packaging and display of bacon or other foods for promotion and sale. Additionally, the disclosed cooker is not disposable and requires cleaning after use. Likewise, grease from the cooked bacon may be introduced into sewers and septic tanks.

U.S. Pat. No. 7,259,360 and U.S. Pat. Appl. Pub. 2008/0110353 to Sholders and Sims, respectively each disclose a tent-like structure for holding bacon during cooking thereby enabling bacon grease to drain down the sides of the tent into a box-shaped receptacle. Neither of the aforementioned disclosures shows a method or apparatus which prevents grease splatter to nearby surfaces during cooking of the bacon; nor does either provide a means for keeping the bacon from curling while being cooked. Furthermore, there is a risk of contamination exchange between the food and the preparer due to handling of the cooking apparatuses or bacon. Lastly, neither apparatus is useful for the preparation of vegetables and the like.

Accordingly, the need remains for a versatile microwaveable cooking apparatus which is economical, safe, environmentally conscience and is useful to commercial entities and consumers alike.

SUMMARY OF THE INVENTION

The primary object of the present invention is to provide a novel apparatus for packaging food articles, especially bacon and sausage, whereby the packaging itself can be used to ship, display food articles on store shelves, cook the encased food in a microwave oven, and dispose of the used apparatus and food wastes allowing for a comprehensive approach to solving issues like packaging, shipping cooking and biodegradable environmentally conscience deposable while eliminating the problems associated with conventional apparatus and conventional methods for cooking such foods.

A further object of the present invention is to provide an apparatus for cooking bacon or the like in a microwave oven while preventing the mess associated with conventional apparatuses and methods for cooking such foods.

Another object of the present invention is to provide a method of cooking bacon or the like in a microwave oven which reduces the risk of injury from hot grease contact which is commonly associated with conventional apparatus and methods for cooking such foods.

It is a further object of the present invention to provide a microwaveable food article package which is simple in construction, inexpensive to manufacture, convenient to use, disposable, and eco-friendly, i.e., biodegradable.

Yet another object of the present invention is to maintain a desirable presentation and improve palatability of packaged bacon after cooking.

Another object of the present invention is to provide a singular package and cooking apparatus for a food article, especially bacon, that reduces cross-contamination by eliminating the need to handle the food article during preparation and cooking.

A still further object of the present invention is to provide an unpackaged (i.e., without a food article encased) microwave oven cooking apparatus with the aforementioned benefits for institutional, consumer, or other like use.

The above summary does not include an exhaustive list of all aspects, benefits, and features of the present invention. For example, the apparatus of the present invention may be configured in any shape, including, but not limited to, rectangular, square, circular, hexagonal, etc. Indeed, the inventor contemplates that the invention includes all apparatuses and methods that can be practiced from all suitable combinations of the various aspects summarized above, as well as those disclosed in the detailed description below and particularly pointed out in the claims. Such combinations have particular advantages not specifically recited in the above summary.

BRIEF DESCRIPTION OF THE DRAWINGS

FIG. 1A is a side view of the assembled food article package and cooker 10 of the present invention;

FIG. 1B is a perspective view of the assembled food article package and cooker 20 with bacon strips 21 encased.

FIGS. 2A and 2B are a top view and side view, respectively, of the top cover 100;

FIGS. 3A and 3B are a top view and side view, respectively, of the middle pan 200; and FIGS. 4A and 4B are a top view and side view, respectively, of the bottom basin 300.

FIG. 5A and 5B are a top view and side view, respectively, of a middle pan of a cooking apparatus in accordance with an embodiment of the present disclosure.

FIG. 6A and 6B are a top view and side view, respectively, of a bottom basin of a cooking apparatus in accordance with an embodiment of the present disclosure.

FIG. 7A and 7B are a bottom view and section thru view, respectively, of a top cover of a cooking apparatus in accordance with an embodiment of the present disclosure.

DETAILED DESCRIPTION OF THE INVENTION AND PREFERRED EMBODIMENTS

Referring now to FIGS. 1A, 2A, 3A, and 4A, a microwaveable food article cooker 10 according to various aspects of the present invention provides numerous benefits, notably a simple construction, manufactured from a biodegradable material such as bulrush. In one embodiemnt, material of manufacture forming a top cover, a middle pan, and a catch basin of the food article cooker can be bulrush. The cooker includes a top cover 100 that sits loosely atop a middle pan 200. By reference to FIGS. 2B and 3B, the cover 100 and the pan 200 are together held in place by gravity, mated at the surface formed by the top cover pocket 101 and the middle pan lip 201.

Now including reference to FIG. 4B, the middle pan 200 incorporates a pocketed portion 202 and, together or separately with the cover 100, securely attaches to the catch basin 300 by mating (e.g., snap on) of the middle pan pocketed portion 202 with the catch basin lip 301. The aforementioned attachment means may be as generally described in U.S. Pat. No. 4,574,974 (herein incorporated by reference) or other commonly known snap-on designs familiar to those skilled in the art.

Alternatively, the aforementioned mating surfaces may be formed by transposing pocketed portions and lipped features, such that, for example, the top cover 100 would include a lip and the middle pan 200 a pocket where these two pieces mate. Likewise, the middle pan 200 would include a lip and the bottom catch basin 300 would include a pocket where these two pieces mate.

In a preferred exemplary embodiment, foods, such as bacon strips 21, may be prepackaged in a microwaveable food article cooker 20 by manufacturers of food and meat products. To prevent curling and twisting during cooking, bacon may, at the time of packaging, be positioned generally perpendicularly between the top cover which is comprised of a plurality of cover ridges 102 and the middle pan, itself comprised of a plurality of pan ridges 203. The cover ridges 102 and pan ridges 203 may be cusped or rounded to any suitable radius at their respective apexes to prevent bacon, sausages, hotdogs, and the like from sticking to the surface of the top cover and middle pan, respectively.

While cooking, bacon will also splatter and produce grease. The top cover 100 prevents bacon splatter from hitting the inside oven walls or other surfaces (as bacon continues to cook after being removed from the microwave oven). The top cover also directs splatter downward by gravity through a plurality of thru holes 204 in the middle pan. This simple feature allows grease or other liquids from bacon, or other foods being cooked to flow down into the catch basin 300, thereby enhancing the palatability of the cooked food.

Hot grease or other liquids expelled from bacon or other foods flows downward through the holes 204 and is collected in the bottom catch basin 300 allowing for safer handling and reduced risk of being burned. The middle pan 200 being securely attached to the catch basin 300 contains the hot grease and liquid thereby assuring safer handling. The grease being contained by the middle pan and catch basin assembly may be disposed of as garbage. In another preferred embodiment, the microwaveable cooking apparatus 100 is made of bulrush, a bio-degradable material, allowing for eco-friendly disposal of the used cooker.

In yet another preferred embodiment, the microwaveable cooking apparatus 10 may be utilized for cooking other food types such as seafood, fowl, vegetables, beef, tofu or rice and other foods that can be cooked or steamed in a microwave unit. In such instances, the food article may be placed in the catch basin 300 along with liquid and covered with the middle pan 200 (with or without the top cover 100). Alternatively, the food article may be placed on the middle pan 200 and steamed by liquid held in the catch basin 300. At the preference of the food preparer, the top cover 100 may or may not be used in such instances.

It is indeed contemplated that the microwaveable cooking apparatus 10 may be distributed or sold unpackaged, i.e., without food included. All pieces of the cooker, including the top cover 100, middle pan 200, and catch basin 300 may be distributed or sold separately in any shape or size to accommodate variations of the microwave cooking apparatus 10, including, overall volume, catch basin depth, top cover height, middle pan area, or any other variable dimension.

No one embodiment disclosed herein is essential to the practice of another unless indicated as such. Indeed, the invention, as supported by the disclosure above and in the originally filed claims, includes all systems and methods that can be practiced from all suitable combinations of the various aspects disclosed, and all suitable combinations of the exemplary elements listed. Such combinations have particular advantages, including advantages not specifically recited herein.

Alterations and permutations of the preferred embodiments will become apparent to those skilled in the art upon a reading of the specification and a study of the drawings.

Accordingly, none of the disclosure of the preferred embodiments defines or constrains the invention. Rather, the issued claims variously define the invention. Each variation of the invention is limited only by the recited limitations of its respective claim, and equivalents thereof, without limitation by other terms not present in the claim. For example, claims that do not call for any exact number of elements in a plurality are not limited to any specific configuration or number.

In addition, aspects of the invention are particularly pointed out below using terminology that the inventor regards as having its broadest reasonable interpretation. The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. The conjunction "or" between alternative elements means "and/or," and thus does not imply that the elements are mutually exclusive unless context or a specific statement indicates otherwise. It is understood that the description herein is intended to be illustrative only and is not intended to be limitative. Rather, the scope of the invention described herein is limited only by the claims appended hereto.

What is claimed is:

1. A bio-degradable apparatus suitable for cooking food articles in a microwave oven, said apparatus comprising:
    a top cover having a plurality of ridges on the bottom surface of said cover, and a pocket disposed on the bottom surface of the cover, said pocket being positioned proximate to the periphery of the cover;
    a middle pan having a plurality of ridges on the top surface of said pan; a lip disposed on the top surface of the pan, said lip being positioned proximate to the periphery of the pan; and a pocket disposed on the bottom surface of the pan, said pocket being positioned proximate to the periphery of the pan; and
    a bottom catch basin having a lip disposed on the top surface of the catch basin, said lip being positioned proximate to the periphery of the catch basin.

2. The bio-degradable apparatus of claim 1 wherein the material of manufacture forming the top cover, middle pan, and catch basin is bulrush.

3. The bio-degradable apparatus of claim 1, wherein the middle pan has a plurality of vertical through holes whereby liquid produced from cooking food articles flow from the middle pan to the catch basin.

4. The bio-degradable apparatus of claim 1, further comprising
    one or more food articles pre-packaged between the top cover and the bottom catch basin.

5. The bio-degradable apparatus of claim 4, wherein said one ore more food articles are selected from the group consisting of bacon, sausage, hamburger, and hot dogs.

6. The bio-degradable apparatus of claim 4, wherein said one ore more food articles are vegetables.

7. The bio-degradable apparatus of claim 1 whereby the middle pan and the bottom catch basin are securely attached for safe handling of cooked food articles.

8. The bio-degradable apparatus of claim 1 whereby the middle pan and the bottom catch basin are securely attached for safe disposal of food article liquids.

* * * * *